(12) United States Patent
Chang

(10) Patent No.: US 6,776,492 B1
(45) Date of Patent: Aug. 17, 2004

(54) MULTIPLE REFLECTIVE MIRRORS MODULE

(75) Inventor: Sean Chang, Taoyuan (TW)

(73) Assignee: Delta Electronics, Inc. (TW)

( * ) Notice: Subject to any disclaimer, the term of this patent is extended or adjusted under 35 U.S.C. 154(b) by 0 days.

(21) Appl. No.: 10/722,006

(22) Filed: Nov. 25, 2003

(30) Foreign Application Priority Data

Mar. 19, 2003 (TW) ........................................ 92106106 A

(51) Int. Cl.$^7$ .......................... G03B 21/28; G02B 5/08; G02B 7/182; G02F 1/00; H04N 5/74
(52) U.S. Cl. .......................... 353/99; 359/850; 348/771
(58) Field of Search .............................. 353/30, 31, 87, 353/98, 99, 122; 359/223, 224, 850; 348/770, 771; 362/269, 275

(56) References Cited

U.S. PATENT DOCUMENTS

| | | | | |
|---|---|---|---|---|
| 6,002,507 A | * | 12/1999 | Floyd et al. | ................ 359/201 |
| 6,643,069 B2 | * | 11/2003 | Dewald | ...................... 359/629 |
| 6,705,735 B1 | * | 3/2004 | Chang et al. | ................ 353/99 |
| 2003/0133204 A1 | * | 7/2003 | Chen et al. | ................ 359/861 |
| 2003/0179349 A1 | * | 9/2003 | Fukunaga et al. | ............ 353/99 |

* cited by examiner

*Primary Examiner*—Russell Adams
*Assistant Examiner*—Melissa J Koval
(74) *Attorney, Agent, or Firm*—Webb Ziesenheim Logsdon Orkin & Hanson, P.C.

(57) ABSTRACT

A multiple reflective mirrors module is described. The module is utilized in an optical engine of a business machine, such as a projector, a laser printer, a copy machine, or a scanner. The module has a fixed reflective mirror, a first tilting reflective mirror, and a second tilting reflective mirror. The first tilting reflective mirror receives an incident light and reflects the incident light to the fixed reflective mirror. Subsequently, the light is reflected by the fixed reflective mirror to the second tilting reflective mirror. Therefore, the second tilting reflective mirror generates an output light. When the first tilting reflective mirror rotates within an angle $\theta_1$ and the second tilting reflective mirror rotates within an angle $\theta_2$, the output light is capable of rotating within an output angle, twice of $\theta_1+\theta_2$. The fixed reflective mirror can be replaced by another tilting reflective mirror.

20 Claims, 4 Drawing Sheets

MULTIPLE REFLECTIVE MIRRORS MODULE

FIELD OF THE INVENTION

The present invention relates to a multiple reflective mirrors module, and especially, to a multiple reflective mirrors module for an optical engine.

BACKGROUND OF THE INVENTION

Due to the rapid progress of the optical and semiconductor technology, office machines, such as fax machines, copy machines, scanners, printers, and optical projectors not only enjoy reduced size but increased accuracy. Currently, color image displays, such as optical projectors, are in high demand due to the great progress of multimedia and network technologies. Therefore, portable optical projectors are undergoing continuous development. Optical projection technologies have progressed successfully and the price, volume and weight thereof have decreased while the market for the same has increased.

The market for digital optical projectors continues to expand due to commercial presentation and home theater demands. In early stages, the optical projector utilized a cathode ray tube (CRT) to project the images through an enlarging lens and onto a display screen. The CRT projector utilizes the RGB color separation method to reproduce the color images on the display screen. Therefore, a CRT projector must use three sets of lens for RGB, respectively. The size, volume, weight and cost are difficult to reduce. In particular, the focusing accuracy of the three color guns is very difficult to adjust. Hence, the CRT projector has gradually been replaced.

Digital optical projectors have only one gun and enjoy superior performance, reduced volume and cheaper cost. Current digital projectors include liquid crystal display (LCD) projectors, digital light processing (DLP) projectors, and liquid crystal on silicon (LCOS) projectors. LCD projectors utilize light streams that pass directly through a lens to reproduce color images. DLP and LCOS projectors utilize high luminance light streams projected on display elements and reflect these light streams through a lens to reproduce color images.

At present, LCD projectors are the mainstream digital optical projectors. However, the DLP projectors provide advantages of light-weight machinery and high image quality and are gradually equaling the market share of the LCD projectors. In addition, the LCOS projectors produced by the semiconductor manufacture process can easily enhance the image resolutions and simplify the manufacture process to reduce the cost thereof. Hence, the LCOS projector is an up-and-coming optical projector.

The DLP projector is the mainstream portable projector because it enjoys a high response speed, light weight, high light streams utility rate, and high image resolution. A DLP optical engine is a reflection-type optical engine. The DLP optical engine attaches a digital micro-mirror device (DMD) to a complementary metal-oxide semiconductor (COMS) memory and controls a tilt angle of each mirror by way of an electrode control to control the light stream reflection angle. A DMD chip is a micro-mirror chip produced by Texas Instruments. The DMD chip is based on a micro electromechanical system (MEMS) and is combined with the digital optical switch manufactured by a semiconductor manufacture process to construct the digital optical process technology, that is, the digital optical process technology combines the digital image process, memory manufacture technology, and optical process technology.

The reflection rate of the mirrors controlled by the electrodes of the DLP chip is about 95%. Further, with digital controls, the DLP projectors include higher luminance, more correct color reproduction, higher response speed, and lower noise than a LCD projector. Furthermore, due to the simple structure of the DLP projector, the DLP projector is lighter than a similar LCD projector.

The mirrors of the DLP projectors normally rotate between +10 degrees to −10 degrees according to the digital control signals. Each mirror corresponds to the CMOS memory to deal with the tilt angle thereof. However, the tilt angles of the mirrors are limited by technology and lifetime. Therefore, the tilt angle of the mirrors cannot be increased by much.

SUMMARY OF THE INVENTION

One object of the present invention is to provide a multiple reflective mirrors module that efficiently increases the total working angle of thereof.

Another object of the present invention is to provide an optical engine with a multiple reflective mirrors module for use in various office machines.

To achieve these and other advantages and in accordance with the object of the invention, the present invention provides a multiple reflective mirrors module which is utilized in an optical engine. The multiple reflective mirrors module has a fixed reflective mirror, a first tilting reflective mirror, and a second tilting reflective mirror. The first tilting reflective mirror reflects an incident light to form a first reflected light and transmits the same to the fixed reflective mirror. The first reflected light is formed with an angle variation $2\theta_1$ when the first tilting reflective mirror rotates an angle $\theta_1$.

The second tilting reflective mirror is disposed opposite the fixed reflective mirror so that the first reflected light is reflected by the fixed reflective mirror and is transmitted to the second tilting reflective mirror and then is reflected by the second tilting reflective mirror to form a second reflected light The second reflected light is formed with an angle variation $2\theta_1+2\theta_2$ when the second tilting reflective mirror rotates an angle $\theta_2$.

The first tilting reflective mirror and the second tilting reflective mirror are formed on a same substrate, such as a semiconductor silicon substrate. The optical engine is utilized in a projector, a laser printer, a copy machine, or a scanner. When the first tilting reflective mirror and the second tilting reflective mirror have a same rotationally axial direction, the second reflected light scans on a line segment. When the first tilting reflective mirror and the second tilting reflective mirror have respectively differently rotational axial directions, the second reflected light scans on a surface.

The fixed reflective mirror can be replaced by a third tilting reflective mirror to scan on a line segment or a surface. Furthermore, between the first tilting reflective mirror and the second tilting reflective mirror, the substrate can further comprises N tilting reflective mirror to enlarge the angle variation to $2(\theta_1+\theta_2+\ldots+\theta_{N+2})$. In addition, the fixed reflective mirror can be replaced by N+1 tilting reflective mirror formed on another substrate and controlled by circuits formed on the other substrate.

Therefore, the multiple reflective mirrors module according to the present invention can enlarge the working angle of the optical engine and increase the lifetime thereof.

Furthermore, the scanning speed of the optical engine can be increased and the manufacturing cost can be reduced.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENT

The following description is the best presently contemplated mode of carrying out the present invention. This description is not to be taken in a limiting sense but is made merely for the purpose of describing the general principles of the invention. The scope of the invention should be determined by referencing the appended claims.

Figure 1:
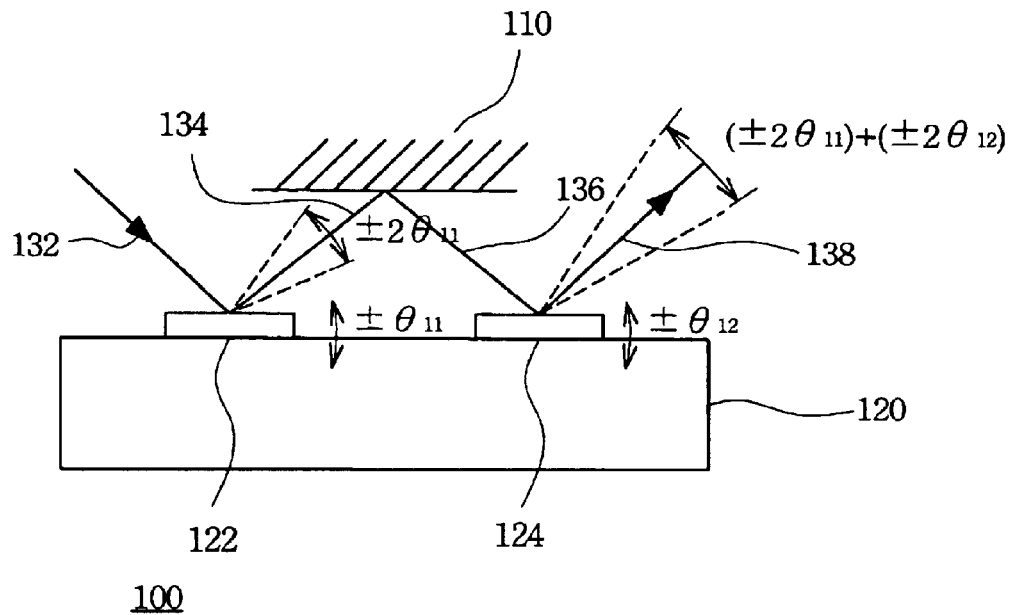
FIG. 1 is a first preferred embodiment of a multiple reflective mirrors module according to the present invention.

FIG. 1 is a first preferred embodiment of a multiple reflective mirrors module according to the present invention. The multiple reflective mirrors module 100 has a fixed reflective mirror 110, a first tilting reflective mirror 122 and a second tilting reflective mirror 124. The first tilting reflective mirror 122 and the second tilting reflective mirror 124 are manufactured on a substrate 120. In this preferred embodiment, the first tilting reflective mirror 122 and the second tilting reflective mirror 124 utilize a micro-electro-mechanical-system (MEMS) to manufacture angle-controllable reflective mirrors on the substrate 120. The first tilting reflective mirror 122 and the second tilting reflective mirror 124 can also be any angle-controllable reflective mirror manufactured with any other technology or manufacturing process. The substrate 120 is a semiconductor silicon substrate, and micro-mirrors and control circuits are formed thereon.

When incident light 132 is transmitted into the module 100, the incident light 132 contacts the first tilting reflective mirror 122. The first tilting reflective mirror 122 has an adjustable angle $\pm\theta_{11}$, meaning that the first tilting reflective mirror 122 can rotate between $-\theta_{11}$ and $+\theta_{11}$. Subsequently, the incident light 132 is reflected by the surface of the first tilting reflective mirror 122 to form the reflected light 134. Because the first tilting reflective mirror 122 can rotate between angles $\pm\theta_{11}$ the reflected light 134 can swing between angles $\pm 2\theta_{11}$.

Then, the reflected light 134, that is, the incident light of the fixed reflective mirror 110, is transmitted to the fixed reflective mirror 110 and is subsequently reflected to form an incident light 136 of a second tilting reflective mirror 124. Because the second tilting reflective mirror 124 can rotate between angles $\pm\theta_{12}$, the reflected light 138 reflected by the surface of the second tilting reflective mirror 124 not only can swing in the angles $\pm 2\theta_{11}$ but also can swing in the angles $\pm 2\theta_{12}$.

That is to say, if a unit of electrical equipment utilizes the multiple reflective mirrors module according to the present invention, the first tilting reflective mirror 122 needs to rotate about 2.5 degrees and the second tilting reflective mirror 124 needs to rotate about 2.5 degrees so that the total scanning angle of the module can reach about 10 degrees. The rotation angle of each mirror is decreased. Therefore, the optical engine with the multiple reflective mirrors module according to the present invention can enhance the working lifetime thereof. Because the total scanning angle is extended while each mirror only rotates a small angle, the multiple reflective mirrors module according to the present invention can provide an extended scanning angle and a high scanning speed.

Each mirror of the multiple reflective mirrors module can rotate in various directions. For example, the mirrors can rotate in an X-coordinate plane, a Y-coordinate plane or a combination plane thereof. The mirrors of the multiple reflective mirrors module is not limited to rotation around one rotational axis. The mirror rotation direction is adjustable according to the requirements of the unit of electrical equipment.

Figure 2:
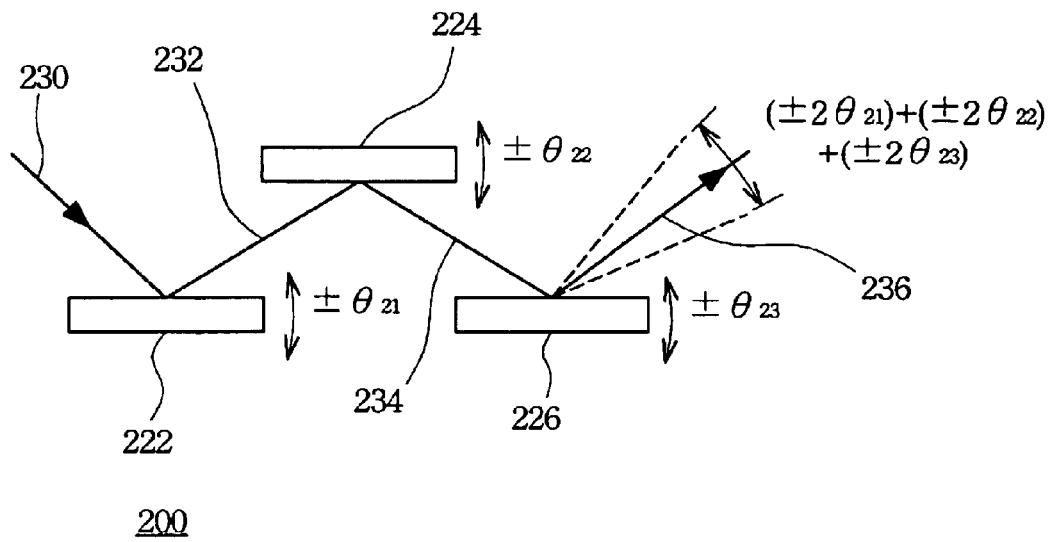
FIG. 2 is a second preferred embodiment of a multiple reflective mirrors module according to the present invention.

FIG. 2 is a second preferred embodiment of a multiple reflective mirrors module according to the present invention. The multiple reflective mirrors module 200 includes a first tilting reflective mirror 222, a second tilting reflective mirror 224, and a third tilting reflective mirror 226. In this preferred embodiment, the multiple reflective mirrors module 200 includes three rotatable reflective mirrors. The first tilting reflective mirror 222 and the third tilting reflective mirror 226 are similar to the first tilting reflective mirror 122 and the second tilting reflective mirror 124 shown in FIG. 1, which are manufactured on a substrate. For clear explanation of light streams transmission path, the substrate is removed from FIG. 2 and the following drawings, FIG. 3 to FIG. 5.

When an incident light 230 transmits into the multiple reflective mirrors module 200, the incident light 230 is reflected by the surface of the first tilting reflective mirror 222 to form the reflected light 232, the incident light of the second tilting reflective mirror 224. Subsequently, the incident light of the second tilting reflective mirror 224 is reflected by the second tilting reflective mirror 224 to form the incident light 234 of the third tilting reflective mirror 226. The incident light 234 is then reflected by the surface of the third tilting reflective mirror 226 to form the reflected light 236. Because the first tilting reflective mirror 222, the second tilting reflective mirror 224, and the third tilting reflective mirror 226 can rotate angles $\pm\theta_{21}$, $\pm\theta_{22}$, and $\pm\theta_{23}$ respectively, the reflected light 236 can rotate within the angles $(\pm 2\theta_{21})+(\pm 2\theta_{22})+(\pm 2\theta_{23})$.

The angles $\theta_{21}$, $\theta_{22}$, and $\theta_{23}$ are not limited to rotation in a same axial direction; the angles $\theta_{21}$, $\theta_{22}$, and $\theta_{23}$ can rotate in two axial directions to form a combination of the X-coordinate and the Y-coordinate rotational axes. Therefore, the three tilting reflective mirrors effectively provide the multiple reflective mirrors module according to the present invention with a more extended working angle.

The multiple reflective mirrors modules 100, 200 can efficiently be utilized in various kinds of electrical equipment, such as optical image displays, optical image transmitting devices, and optical image copy devices. The following descriptions efficiently illustrate advantages and features of practical applications according to the present invention when taken in conjunction with the accompanying drawings.

Figure 3:
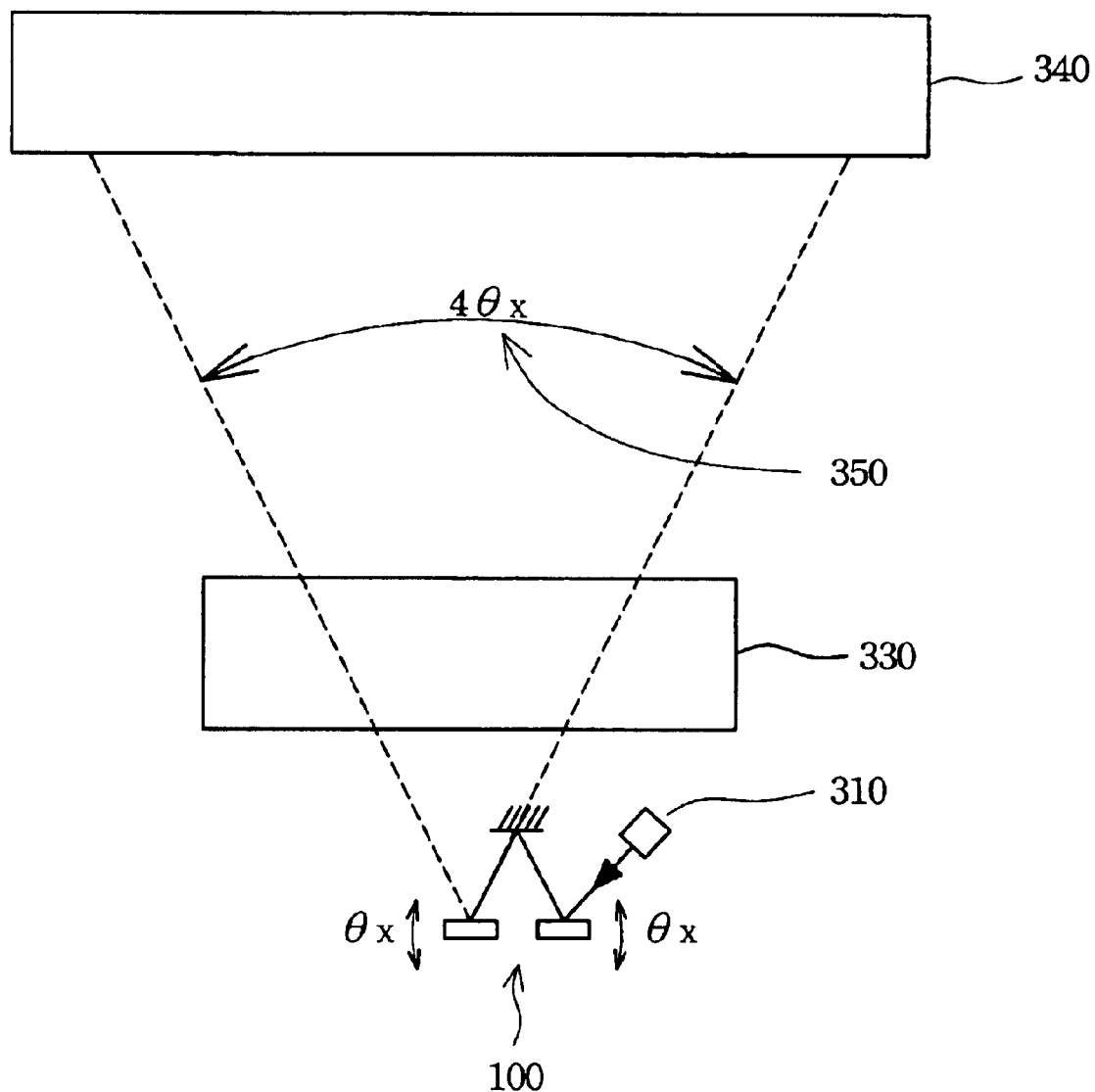
FIG. 3 is a laser printer with the multiple reflective mirrors module according to the present invention.

FIG. 3 is a laser printer with the multiple reflective mirrors module 100 according to the present invention. The multiple reflective mirrors module 100 is installed in a laser printer. The laser printer has a light source 310, a multiple reflective mirrors module 100, lens 330, and a photo conductor drum 340. The light source 310 can be a semiconductor light source, such as a light emitting diode (LED). The laser printer can print an image on a medium when the light streams generated by the light source 310 are regulated and magnified by the multiple reflective mirrors module 100 and transmitted to the photo conductor drum 340 to form a corresponding image thereon. The photo conductor drum 340 can provide a Y-direction rotation for the laser printer and therefore the multiple reflective mirrors module 100 needs to scan the X-direction only. While each tilting reflective mirror can enlarge double the rotational angle thereof to form the reflected light streams, the two tilting reflective mirrors can provide a scanning angle, $4\theta_X$, for the laser print to scanning on the photo conductor drum 340. That is, each tilting reflective mirror needs to rotate ¼ angle for scanning on the photo conductor drum 340, and therefore the laser printer utilizing the multiple reflective mirrors module has enhanced printing speed and lifetime because each tilting reflective mirror rotates a smaller angle.

Figure 4:
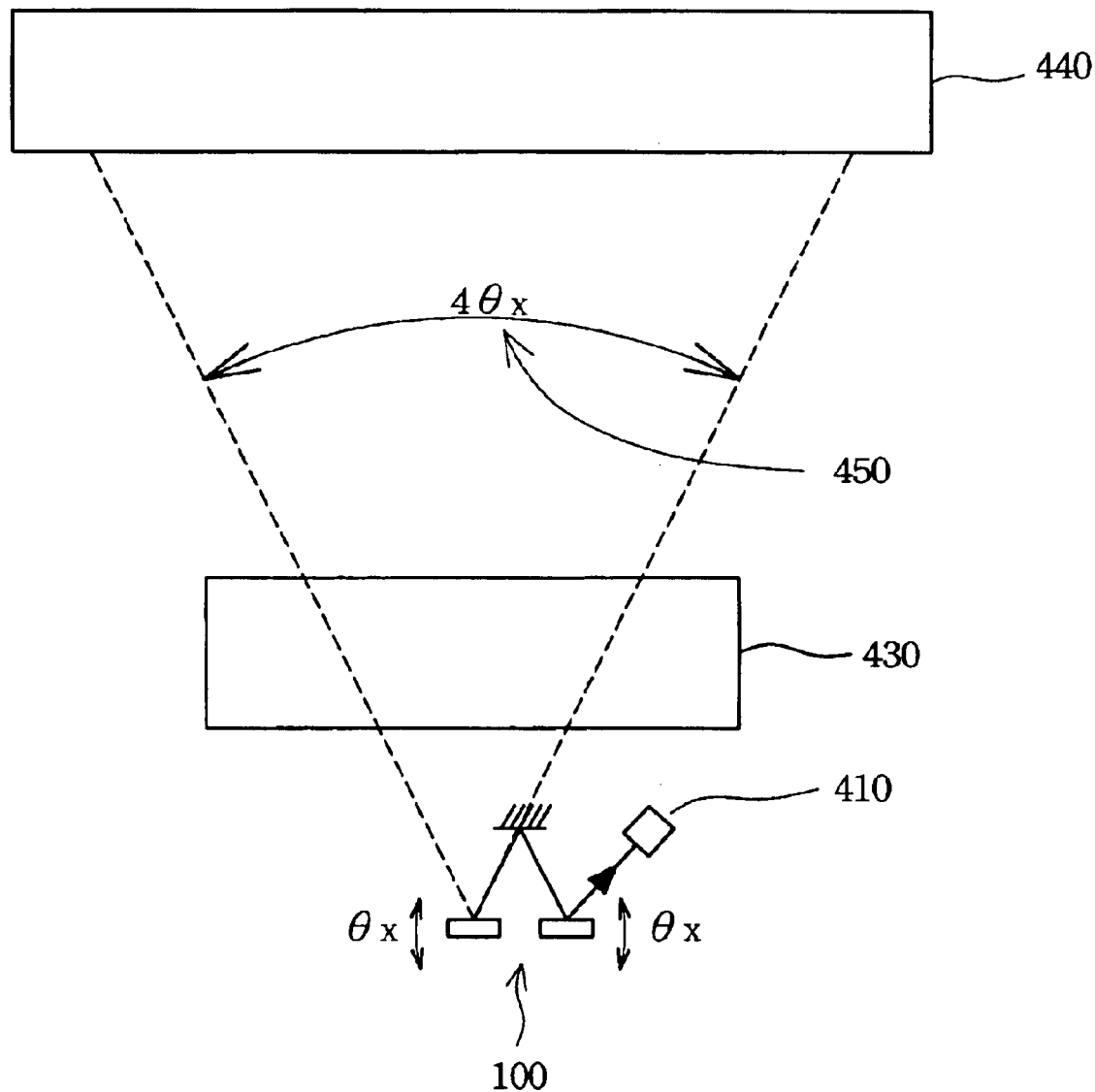
FIG. 4 is a scanner with the multiple reflective mirrors module according to the present invention.

FIG. 4 is a scanner with the multiple reflective mirrors module 100 according to the present invention. The scanner has an optical receiver 410, a multiple reflective mirrors module 100, lens 430, and a roller 440. The optical receiver 410 of the scanner includes a photo diode and other element. A light source of the scanner can be any light source for scanner lighting.

The scanner utilizes the roller 440 rotations to feed an original document in the Y-coordinate direction. Therefore, the multiple reflective mirrors module 100 only needs to provide an X-coordinate direction movement to scan the whole original document. When the tilting reflective mirrors can adjust about $\theta_X$, the scanner can scans the scanning angle 450 between $4\theta_X$. Therefore, each tilting reflective mirror needs to rotate a quarter of the scanning angle 450 and the scanner can fully scan the whole original document.

Figure 5:
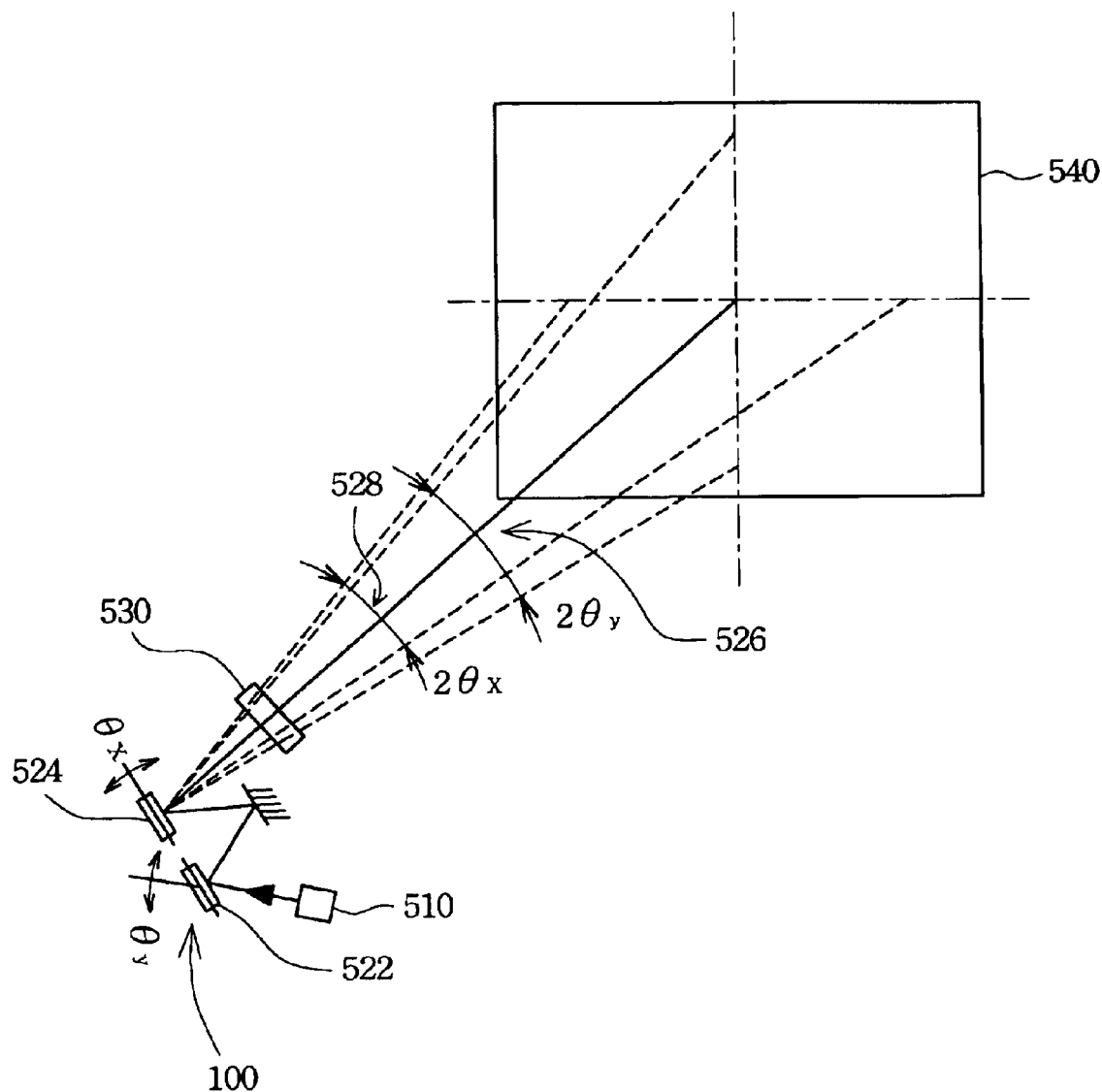
FIG. 5 is a projector with the multiple reflective mirrors module according to the present invention.

FIG. 5 is a projector with the multiple reflective mirrors module 100 according to the present invention. The projector has a light source 510, lens 530 and a multiple reflective mirrors module 100. The multiple reflective mirrors module 100 further has a first tilting reflective mirror 522 and a second tilting reflective mirror 524, which can rotate in the Y-coordinate direction and the X-coordinate direction about $\theta_Y$ and $\theta_X$, respectively. When the first tilting reflective mirror 522 rotates an angle $\theta_Y$ and the second tilting reflective mirror 524 rotates about an angle $\theta_X$, the display area 540 can demonstrate images thereon about a first display angle 526 and a second display angle 528. The first display angle 526 is about two times $\theta_Y$ and the second display angle 528 is about two times $\theta_X$.

The practical applications of the multiple reflective mirrors module as illustrated in FIG. 3 to FIG. 5 illustrate only the first preferred embodiment of FIG. 1. However, the practical applications can be also achieved with the second preferred embodiment as shown in FIG. 2.

The multiple reflective mirrors module 100 and 200 can enlarge the scanning angle by way of the tilting reflective mirror rotation, and therefore each tilting reflective mirror can decrease the rotation angle thereof to increase the working lifetime. The scanning speed is also increased due to increased mechanical scanning speed. Furthermore, the linear control capability of the tilting reflective mirror is more stable under a small rotation angle, and therefore the rotational accuracy is also increased. The tilting reflective mirrors can be manufactured on a same substrate so that the manufacturing cost can be reduced and the optical transmission axis can be more precise. The present invention is not limited to the quantity of the tilting reflective mirrors and fixed reflective mirror. One tilting reflective mirror in conjunction with a fixed reflective mirror can enlarge the rotation angle of the tilting reflective mirror and the fixed reflective mirror can also replaced by another tilting reflective mirror to enlarge the scanning angle. The multiple reflective mirrors module according to the present invention can also be utilized in other office machines such as, for example, a copy machine.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A multiple reflective mirrors module utilized in an optical engine, the multiple reflective mirrors module comprising:
   a first tilting reflective mirror;
   a second tilting reflective mirror disposed opposite the first tilting reflective mirror, an incident light of the second tilting reflective mirror being reflected by the second tilting reflective mirror to form a first reflected light transmitted to the first tilting reflective mirror, wherein the first reflected light is formed with an angle variation $2\theta_1 + 2\theta_2$ when the first tilting reflective mirror rotates an angle $\theta_1$ and the second tilting reflective mirror rotates an angle $\theta_2$; and
   a third tilting reflective mirror disposed opposite the first tilting reflective mirror, the first reflected light being reflected by the first tilting reflective mirror, transmitted to the third tilting reflective mirror, and then reflected by the third tilting reflective mirror to form a second reflected light, wherein the second reflected light is formed with an angle variation $2\theta_1 + 2\theta_2 + 2\theta_3$ when the third tilting reflective mirror rotates an angle $\theta_3$.

2. The multiple reflective mirrors module of claim 1, wherein the second tilting reflective mirror and the third tilting reflective mirror are formed on a same substrate.

3. The multiple reflective mirrors module of claim 2, wherein the angle $\theta_2$ of the second tilting reflective mirror and the angle $\theta_3$ of the third tilting reflective mirror are controlled by circuits constructed on the substrate.

4. The multiple reflective mirrors module of claim 2, wherein the substrate is a semiconductor substrate.

5. The multiple reflective mirrors module of claim 1, wherein the first tilting reflective mirror is a fixed reflective mirror.

6. The multiple reflective mirrors module of claim 1, wherein the first tilting reflective mirror is formed on another substrate and the angle $\theta_1$ of the first tilting reflective mirror is controlled by circuits constructed on an other substrate.

7. The multiple reflective mirrors module of claim 6, wherein the other substrate is a semiconductor substrate.

8. The multiple reflective mirrors module of claim 1, wherein the first tilting reflective mirror, the second tilting reflective mirror and the third tilting reflective mirror have a same rotationally axial direction so that the second reflected light scans on a line segment.

9. The multiple reflective mirrors module of claim 1, wherein the first tilting reflective mirror, the second tilting reflective mirror and the third tilting reflective mirror have at least two rotationally axial directions so that the second reflected light scans on a surface.

10. The multiple reflective mirrors module of claim 1, wherein the optical engine is utilized in a projector to display images.

11. The multiple reflective mirrors module of claim 1, wherein the optical engine is utilized in a laser printer to reproduce images.

12. The multiple reflective mirrors module of claim 1, wherein the optical engine is utilized in a copy machine to reproduce images.

13. The multiple reflective mirrors module of claim 1, wherein the optical engine is utilized in a scanner to scan images.

14. A multiple reflective mirrors module utilized in an optical engine, the multiple reflective mirrors module comprising:

a fixed reflective mirror;

a first tilting reflective mirror disposed opposite the fixed reflective mirror, an incident light of the first tilting reflective mirror being reflected by the first tilting reflective mirror to form a first reflected light transmitted to the fixed reflective mirror, wherein the first reflected light is formed with an angle variation $2\theta_1$ when the first tilting reflective mirror rotates an angle $\theta_1$; and a second tilting reflective mirror disposed opposite the fixed reflective mirror, the first reflected light being reflected by the fixed reflective mirror, transmitted to the second tilting reflective mirror, and then reflected by the second tilting reflective mirror to form a second reflected light, wherein the second reflected light is formed with an angle variation $2\theta_1+2\theta_2$ when the second tilting reflective mirror rotates an angle $\theta_2$.

15. The multiple reflective mirrors module of claim 14, wherein the first tilting reflective mirror and the second tilting reflective mirror are formed on a same substrate.

16. The multiple reflective mirrors module of claim 15, wherein the angle $\theta_1$ of the first tilting reflective mirror and the angle $\theta_2$ of the second tilting reflective mirror are controlled by circuits constructed on the substrate.

17. The multiple reflective mirrors module of claim 15, wherein the substrate is a semiconductor substrate.

18. The multiple reflective mirrors module of claim 14, wherein the optical engine is utilized in a projector, a laser printer, a copy machine, or a scanner.

19. The multiple reflective mirrors module of claim 14, wherein the first tilting reflective mirror and the second tilting reflective mirror have a same rotationally axial direction so that the second reflected light scans on a line segment.

20. The multiple reflective mirrors module of claim 14, wherein the first tilting reflective mirror and the second tilting reflective mirror have respective rotationally axial directions so that the second reflected light scans on a surface.

* * * * *